US012759869B2

(12) United States Patent
Ulber et al.

(10) Patent No.: US 12,759,869 B2
(45) Date of Patent: Oct. 13, 2026

(54) METHOD FOR INTEGRATING AMMONIA CRACKING IN A STEAM METHANE REFORMER

(71) Applicant: L'Air Liquide, Societe Anonyme pour l'Etude et l'Exploitation des Procedes Georges Claude, Paris (FR)

(72) Inventors: Dieter Ulber, Frankfurt am Main (DE); Thomas Wurzel, Frankfurt am Main (DE); Teja Schmid McGuiness, Frankfurt am Main (DE); Florian Pontzen, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 633 days.

(21) Appl. No.: 18/133,580

(22) Filed: Apr. 12, 2023

(65) Prior Publication Data

US 2024/0343561 A1 Oct. 17, 2024

(51) Int. Cl.
*C01B 3/047* (2026.01)
*B01D 53/047* (2006.01)
(Continued)

(52) U.S. Cl.
CPC ............ *C01B 3/047* (2013.01); *B01D 53/047* (2013.01); *B01J 19/02* (2013.01); *B01J 19/2415* (2013.01);
(Continued)

(58) Field of Classification Search
None
See application file for complete search history.

(56) References Cited

U.S. PATENT DOCUMENTS 10,112,829 B2 10/2018 Ravikumar et al.
2023/0242395 A1* 8/2023 Shaw .................. B01D 53/047 423/658.2
(Continued)

FOREIGN PATENT DOCUMENTS

CA 3 206 483 7/2022
CA 3223160 A1 12/2022
(Continued)

OTHER PUBLICATIONS

Wang, et al., "Ammonia as hydrogen carrier for transportion; investigation of the ammonia exhaust gas fuel reforming," p. 9908.
(Continued)

*Primary Examiner* — John J Figueroa
(74) *Attorney, Agent, or Firm* — Justin K. Murray

(57) ABSTRACT

A method for retrofitting an existing steam methane reformer (SMR) for ammonia cracking is provided. In this embodiment, the existing SMR can include a pre-reformer, a desulfurization unit, a furnace, waste heat recovery sections, a water gas shift reactor, a pressure swing adsorption (PSA) unit, wherein the furnace has a plurality of SMR tubes and a plurality of burners. In certain embodiments, the method can include the steps of: providing the existing SMR; taking the desulfurization unit offline such that no fluid flows through the desulfurization during operation; taking the pre-reformer offline such that no fluid flows through the pre-reformer during operation; and adding means for providing a gaseous ammonia stream to the SMR tubes.

14 Claims, 10 Drawing Sheets

(51) Int. Cl.

| | |
|---|---|
| ***B01J 19/02*** | (2006.01) |
| ***B01J 19/24*** | (2006.01) |
| ***C01B 3/56*** | (2006.01) |

(52) U.S. Cl.

CPC ............ *C01B 3/56* (2013.01); *B01D 2256/16* (2013.01); *B01D 2257/102* (2013.01); *B01D 2257/406* (2013.01); *B01J 2219/00024* (2013.01); *B01J 2219/00087* (2013.01); *B01J 2219/00135* (2013.01); *B01J 2219/0236* (2013.01); *C01B 2203/042* (2013.01); *C01B 2203/0465* (2013.01); *C01B 2203/0833* (2013.01); *C01B 2203/085* (2013.01); *C01B 2203/1294* (2013.01)

(56) References Cited

U.S. PATENT DOCUMENTS

| | | | | |
|---|---|---|---|---|
| 2024/0068081 | A1 | 2/2024 | Beyer et al. | |
| 2024/0253982 | A1* | 8/2024 | White | C01C 1/12 |
| 2024/0270569 | A1* | 8/2024 | White | B01D 53/047 |
| 2024/0279053 | A1* | 8/2024 | White | B01D 53/047 |
| 2024/0294376 | A1* | 9/2024 | Shaw | C01B 3/047 |
| 2024/0342674 | A1* | 10/2024 | Ulber | B01J 8/065 |
| 2024/0343559 | A1* | 10/2024 | Ulber | C01B 3/047 |

FOREIGN PATENT DOCUMENTS

| | | | | |
|---|---|---|---|---|
| EP | 4 112 540 | | 1/2023 | |
| WO | WO 2015/074127 | | 5/2015 | |
| WO | 2021257944 | A1 | 12/2021 | |
| WO | WO 2022/189560 | | 9/2022 | |
| WO | 2022243410 | A1 | 11/2022 | |
| WO | WO 2022/265651 | | 12/2022 | |
| WO | WO-2022265647 | A1 * | 12/2022 | C01B 3/56 |

OTHER PUBLICATIONS

PCT International Search Report and Written Opinion for PCT/US2024/024293, mailed Jul. 19, 2024.

International Search Report and Written Opinion for related PCT/US2024/024284, Jul. 19, 2024.

* cited by examiner

METHOD FOR INTEGRATING AMMONIA CRACKING IN A STEAM METHANE REFORMER

TECHNICAL FIELD OF THE INVENTION

The present invention relates to an apparatus and method for hydrogen production using existing industrial units. More specifically, embodiments of the present invention are related to avoiding embrittlement of steels caused by nitrides, particularly in an existing steam methane reformer that is retrofitted to produce hydrogen from an ammonia feed.

BACKGROUND OF THE INVENTION

In an effort to reduce the effects of carbon dioxide emissions, new energy carriers are becoming increasingly more important. One of the leading energy carriers is hydrogen; however, due to its small molecular size, high pressure requirements, and very low boiling point, transportation of elemental hydrogen is difficult and costly.

Ammonia ($NH_3$) has raised some attention in the literature, since existing infrastructure can be used for storage and transportation (e.g., LPG infrastructure). As such, production of hydrogen using ammonia, instead of natural gas, to produce elemental hydrogen is foreseen to be the future of the next generation of hydrogen production. Unfortunately, new industrial facilities are quite costly to build and take many years to design and produce. Therefore, it will likely be at least a decade or more before any new dedicated ammonia cracking facilities can be operational. In the interim, it is still desirable to proceed with production of hydrogen in a more environmentally sensitive manner, which includes the cracking of ammonia gas by using existing hydrogen production facilities.

Ammonia can be cracked into hydrogen and nitrogen at ambient pressure and moderate temperatures (450-600° C.) in the presence of a catalyst. In order to save hydrogen compression energy on the backend, it can be advantageous to apply higher pressures for the $NH_3$ cracking reaction (it is easier to compress ammonia gas compared to hydrogen gas due to hydrogen's small molecular size). However, at higher pressures, the cracking reaction is not favored according to Le Chatelier's principle, so higher temperatures are favored (around 700° C.) in order to reach economic conversion rates.

Unfortunately, Ammonia is known to lead to nitride formation in steels during the process of $NH_3$ cracking into $H_2$ and $N_2$, particularly so at elevated temperatures. This is because the ammonia cracking reaction at elevated temperature will lead to formation of atomic nitrogen, which diffuses into the metallic material to form nitrides, thereby causing the embrittlement of steels.

As some steels also act as catalysts for the $NH_3$ cracking process, nitride formation of steel can occur at its surface and at temperatures where only small ammonia conversion rates are observed. That means steels might already be at risk of embrittlement during heat up of ammonia to above 400° C.

Currently steam methane reformers are operated with hydrocarbon feedstock, such as natural gas, LPG, naphtha, refinery off gas or the like, at temperatures well above 700° C. FIG. 1 represents a typical SMR process flow diagram. Natural gas 2, which is at approximately 30° C., and recycled hydrogen 4 are mixed and warmed in heat exchanger 10 to a temperature of approximately 360° C. to form hot feed stream 12. Hot feed stream 12 is then introduced to a desulfurization unit 20 for removal of sulfur from hot feed stream 12 to form clean hot feed stream 22, which has a significantly reduced amount of sulfur as compared to hot feed stream 12. Clean hot feed stream 22 is then mixed with process steam 24 and heated in SMR heat recovery section 30 before being introduced to pre-reformer 40 in order to convert the heavier hydrocarbons into methane and carbon oxides (CO, $CO_2$) at relatively low temperatures, typically from 400 to 550° C. The lower temperatures of the pre-reformer 40 are used in order to prevent coke deposition on the walls of the reformer 50 and catalyst surface.

A pre-reformer partially completes the steam reforming reactions upstream of the main steam reformer at a much lower temperature using a highly active catalyst. Aside from reducing coke formation, use of the pre-reformer advantageously allows for the conventional steam reformer furnace, which is the most expensive capital item on the plant, to be made smaller.

The pre-reformed stream 42 is then heated in SMR heat recovery section 30 again using the heat from the flue gas of the primary SMR reaction before introduction to the reformer tubes of the SMR furnace 50. After heating, it is sent to steam methane reformer 50 for reforming to create crude syngas stream 52. As the reforming reaction is endothermic, heat is added to the reaction via combustion of a fuel in the burners. The produced crude syngas stream 52 is then fed to a high temperature water gas shift reactor 60, wherein CO reacts with $H_2O$ to convert the CO to $CO_2$ and produce additional hydrogen. The resulting hot shifted stream 62 is then introduced to natural gas preheater 10 in order to provide the preheating of natural gas 2 from earlier, resulting in warm shifted stream 64, which in this embodiment, can have a temperature of approximately 322° C.

Meanwhile, boiler feed water 72 is withdrawn from boiler feed water preparation system 70, pressurized by pump 80 in order to increase boiler feed water pressure for the downstream steam generation system (not shown). Pressurized boiler feed water stream 82, which is at approximately 106° C. and 60 barg, is then heated in third heat exchanger 90 using the heat from warm shifted stream 64 in order to produce hot boiler feed water stream 92, which is at approximately 221° C. and colder shift gas stream 94. The hot boiler feed water stream 92 can be used to generate steam in a downstream steam generation system (not shown).

Although natural gas typically contains nitrogen, this molecular nitrogen does not lead to critical nitride formation in steels. As such, existing SMRs are not designed with this contingency in mind.

Current materials applied in the feed pretreatment and preheating section of an SMR plant are carbon steel (CS), CrMo, and stainless steel (SS). In short, all of the applied materials contain alloying elements that can easily form nitrides, like iron and chromium. Furthermore, the majority of process equipment in a syngas generation unit is operated well-above 400° C. Therefore, it is not feasible to simply switch the feedstock from hydrocarbons to ammonia for an existing hydrogen production facility.

Process simulations of the ammonia cracking reaction in the proposed pressure range taking into account above temperature limits have shown that the conversion rate of ammonia will be in the range of 90% to 99.8%. The unconverted ammonia content will be in the range of 0.1 to 5.0 mol %, which is below thresholds for damaging downstream equipment.

While downstream equipment is less likely to suffer from these drawbacks, equipment upstream the SMR furnace will likely suffer due to the feed stream being close to 100% ammonia.

As such, there is a need in the art to provide industrial facilities that can efficiently produce hydrogen from ammonia, particularly by retrofitting existing hydrogen production industrial facilities to produce hydrogen from an ammonia feed gas while preventing or at least minimizing embrittlement issues during operation.

SUMMARY OF THE INVENTION

The present invention is directed to an apparatus and process that satisfies at least one of these needs. In certain embodiments of the invention, a method for producing hydrogen in an existing steam methane reformer (SMR) via ammonia cracking is provided. The SMR can include a furnace and a pressure swing adsorption (PSA) unit, wherein the furnace has a plurality of SMR tubes and a plurality of burners. The method for producing hydrogen can include the steps of: providing a gaseous stream consisting essentially of ammonia at a selected minimum temperature; introducing the gaseous stream into the SMR tubes of the furnace under conditions effective for catalytically cracking the ammonia, thereby forming a crude stream comprising hydrogen, nitrogen, and unreacted ammonia; and introducing the crude stream into the PSA unit to produce a hydrogen product stream and a PSA offgas.

In certain embodiments, this minimum temperature is a function of pressure. The ammonia temperature can be such, that ammonia is in the gaseous state (preferably with a 20° C. margin), to avoid condensation at cold points. The higher the pressure, the higher the temperature. In certain embodiments, 100° C. can be a good low choice, as it relates to ~65 bara. While ammonia cracking can be designed up to or even above this pressure, it is typically at a lower pressure of around 55 bara, which means that 100° C. is a safe minimum temperature for the vast majority of applications.

In optional embodiments of the method for producing hydrogen:

- the existing SMR is revamped to further comprise an ammonia storage vessel and an ammonia feed pump;
- step (a) further comprises withdrawing ammonia from the ammonia storage vessel; pumping the ammonia in the ammonia feed pump to a pressure of 25-60 bar(g); and then vaporizing the ammonia to provide the gaseous stream;
- the existing SMR is revamped to further comprise an ammonia vaporizer, wherein the ammonia is vaporized in the ammonia vaporizer to form the gaseous stream, wherein the gaseous stream in step (a) is tied into feed piping or a feed distribution system of the existing SMR, wherein the feed piping and feed distribution system are located immediately upstream the SMR tubes;
- the existing SMR is revamped to further comprise new equipment selected from the group consisting of an ammonia vaporizer, an ammonia interchanger, an ammonia preheater, an ammonia pre-reactor, and combinations thereof, wherein the new equipment is disposed upstream of the SMR tubes and downstream the ammonia feed pump;
- the existing SMR comprises an existing feed superheating section that is located upstream of the SMR tubes, wherein the ammonia is vaporized in the existing feed superheating section;
- the ammonia is vaporized using heat provided by electricity, steam, the crude stream, and/or a flue gas stream;
- the ammonia is vaporized and preheated to below 450° C., preferably below 350° C., more preferably below 300° C.;
- the crude stream contains less than 5.0 mol % unreacted ammonia
- the conditions effective for catalytically cracking the ammonia include a pressure between 15-80 bar, preferably 20-60 bar, and a temperature between 600-850° C., preferably 650-750° C.; and/or
- gaseous stream in step (a) is provided from a pressurized gaseous ammonia feed received from outside of the existing SMR.

In another embodiment, a method for retrofitting an existing steam methane reformer (SMR) for ammonia cracking is provided. In this embodiment, the existing SMR can include a pre-reformer, a desulfurization unit, a furnace, waste heat recovery sections, a water gas shift reactor, a pressure swing adsorption (PSA) unit, wherein the furnace has a plurality of SMR tubes and a plurality of burners. In certain embodiments, the method can include the steps of: providing the existing SMR; taking the desulfurization unit offline such that no fluid flows through the desulfurization during operation; taking the pre-reformer offline such that no fluid flows through the pre-reformer during operation; and adding means for providing a gaseous ammonia stream to the SMR tubes.

In optional embodiments of the method for retrofitting an existing SMR:

- the means for providing the gaseous ammonia stream comprise an ammonia storage vessel, an ammonia feed pump, and means for vaporizing ammonia sourced from the ammonia storage vessel;
- the means for vaporizing ammonia further comprise new equipment selected from the group consisting of an ammonia vaporizer, an ammonia interchanger, an ammonia preheater, an ammonia pre-reactor, and combinations thereof, wherein the new equipment is disposed upstream of the SMR tubes and downstream ammonia feed pump;
- the means for vaporizing ammonia further comprise an existing feed superheating section that is located upstream of the SMR tubes, wherein the existing feed superheating section is revamped by treating inner surfaces of the existing feed superheating section to improve nitridation resistance; and/or
- the step of treating the inner surfaces of the existing feed superheating section includes a process selected from the group consisting of (1) applying a protective liner material that is mechanically coupled to the inner surface, (2) applying an aluminization layer to the inner surface, and (3) applying a diffusion barrier layer in conjunction with the aluminization layer, wherein the diffusion barrier layer is disposed between the inner surface and the aluminization layer.

In another embodiment, an apparatus for producing hydrogen using a retrofitted steam methane reformer (SMR) via ammonia cracking is provided. The apparatus can include: means for providing a pressurized and gaseous ammonia stream to a plurality of reactor tubes; a furnace having the plurality of reactor tubes and a plurality of burners, wherein the furnace is configured to catalytically crack the ammonia within the reactor tubes to produce a crude process gas and a flue gas; a plurality of waste heat recovery sections; and a pressure swing adsorption (PSA)

unit disposed downstream the furnace, wherein the PSA unit is configured to receive the crude process gas, or a gas derived therefrom, and produce a hydrogen product stream and a PSA offgas.

In optional embodiments of the apparatus:

- the means for providing a pressurized and gaseous ammonia stream to a plurality of reactor tubes comprises an ammonia storage vessel and an ammonia pump;
- the means for providing a pressurized and gaseous ammonia stream to a plurality of reactor tubes further comprises an ammonia vaporizer, wherein ammonia is vaporized in the ammonia vaporizer to form the pressurized and gaseous ammonia stream, wherein the pressurized and gaseous ammonia stream is tied into feed piping and/or a feed distribution system of the existing SMR, wherein the feed piping and/or feed distribution system are located immediately upstream the SMR tubes;
- the means for providing a pressurized and gaseous ammonia stream to a plurality of reactor tubes further comprises new equipment selected from the group consisting of an ammonia vaporizer, an ammonia interchanger, an ammonia preheater, an ammonia prereactor, and combinations thereof, wherein the new equipment is disposed upstream of the SMR tubes and downstream the ammonia feed pump;
- the ammonia vaporizer is heated using electricity, steam, the crude stream, and/or a flue gas stream;
- the ammonia vaporizer is configured to vaporize and preheat ammonia at a temperature below 450° C., preferably below 350° C., more preferably below 300° C.;
- the apparatus further includes a waste heat recovery section, wherein the means for providing a pressurized and gaseous ammonia stream to a plurality of reactor tubes further comprises heating pressurized ammonia from the ammonia pump in the waste heat recovery section to form the pressurized and gaseous ammonia stream;
- the furnace is configured to operate at a pressure between 15-80 bar, preferably 20-60 bar, more preferably 20-35 bar, and a temperature between 600-850° C., preferably 650-750° C.;
- the means for providing a pressurized and gaseous ammonia stream to a plurality of reactor tubes comprise piping that has a nitridation resistant material (alloy 600 or 625 series, Ni-base metal or Ni content above 30%) or a nitridation protective layer on an inner surface of the piping;
- the nitridation protective layer is selected from the group consisting of a protective liner material that is mechanically coupled to the inner surface, an aluminization layer applied to the inner surface, a diffusion barrier layer in conjunction with the aluminization layer applied to the inner surface, wherein the diffusion barrier layer is disposed between the inner surface and the aluminization layer, and a weld-overlay applied to the inner surface; and/or
- the plurality of catalyst tubes comprise a nitridation protective layer on an inner surface of the reactor tubes.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
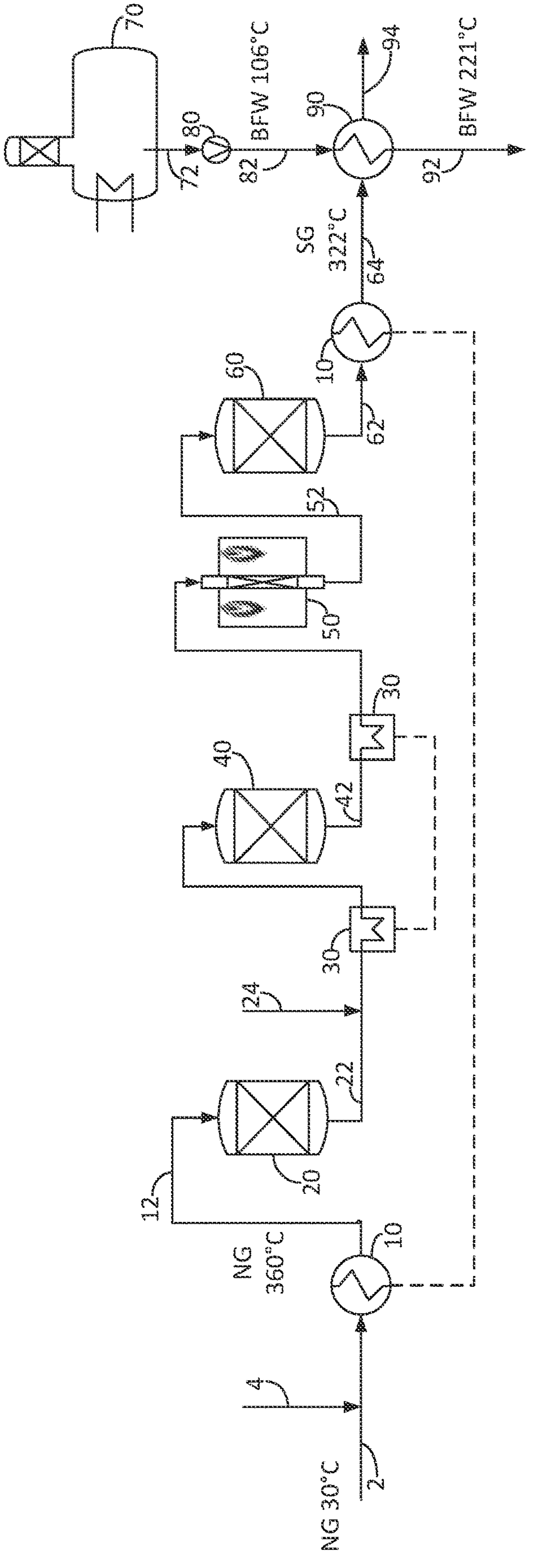
FIG. 1 (PRIOR ART)
FIG. 1 provides an embodiment of a steam methane reformer facility in accordance with an embodiment of the prior art.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While decarbonization of NG-based $H_2$ production is neither simple nor straight forward for the above-mentioned reasons, it is preferred to operate with a full decarbonization of existing plants based on a replacement of fossil feedstocks by ammonia. Ammonia itself can be produced from various sources and it can be easily transported worldwide by ship, pipeline or truck. It does not contain any carbon atoms. Therefore using it within an SMR yields an intrinsic complete decarbonization of the process. However, a replacement of methane by $NH_3$ is not straightforward, but instead the process requires modifications in order to run safely and reliably. The use of $NH_3$ has several significant advantages compared to NG-based SMR and newly built $NH_3$ crackers:

- $CO_2$ emissions are fully or partly eliminated from the plant.
- No additional infrastructure for CCS, e.g. CC unit, steam supply, $CO_2$ storage, $CO_2$ pipelines, tanks, $CO_2$ ships, sequestration site etc. are needed at the location of hydrogen use.
- No additional legislation is needed, since $NH_3$ already is traded worldwide, and therefore its production and shipping are well known.

- Existing SMR assets can be utilized, which saves investment costs and allows a faster rollout compared to new greenfield plants.
- In existing basins, the existing infrastructure and connections to customers can be used.
- In the emerging markets, $H_2$ is typically used in new applications that normally don't require steam. If $NH_3$ is used in SMR, the production of steam as byproduct is reduced due to the lower required heat duty of the $NH_3$ splitting reaction. This is beneficial and increases the overall efficiency of the plant compared to one being tailored to high steam export.
- Broader operation range of the plant due to mitigation of the typical challenges in SMR, i.e. coking and metal dusting corrosion.

In principle, methane and $NH_3$ have some similarities and some differences. Ammonia can be decomposed into $N_2$ and $H_2$ in an endothermic reaction (see Reaction Formulas below). The same is valid for methane. However, here the splitting products are carbon and $H_2$. The production of solid C leads to challenges (clogging, fouling, solids handling). Therefore methane is normally converted within a reforming reaction, i.e. including water as a reagent in order to suppress carbon formation. $NH_3$ splitting with this respect is much easier and does not require steam addition.

$NH_3$ decomposition $$2\,NH_3 \rightleftharpoons N_2 + 3\,H_2 + 31\text{ kJ/mol } H_2$$

SMR reaction $$CH_4 + H_2O \rightleftharpoons CO + 3\,H_2 + 69\text{ kJ/mol } H_2$$

SMR + Watergas Shift reaction $$CH4 + 2\,H_2O \rightleftharpoons CO_2 + 4\,H_2 + 41\text{ kJ/mol } H_2$$

In a modified SMR process with 100% $NH_3$ feed, a few process parts are no longer needed, e.g. the desulfurization, pre-reformer, water gas shift section and condensate systems (refer to scheme).

This leads to reduced OPEX and higher reliability since the respective catalyst-containing vessel can be bypassed and therefore don't need regular monitoring or catalyst replacement. This also can reduce overall pressure drops within the system.

On the other hand, the process can include a few additional units for $NH_3$ handling. Some non-limiting examples may include $NH_3$ storage, a feed supply (pump+vaporizer) and optionally an additional water scrubbing downstream the reactor.

The ammonia cracking reaction requires much less heat per hydrogen molecule than the steam methane reforming reaction. For the case of 100% ammonia as feedstock no process steam is required, because carbon formation of hydrocarbons at too high temperature or heat flux or because of lack of process steam is not an issue anymore. This reduces the required process heat further or alternatively allows to convert more ammonia to hydrogen and increase the hydrogen output of the existing unit.

In a standard steam reforming process, the addition of process steam provides significant waste heat on the process and firing side, both leading to a reduced thermal efficiency of the plant. Process steam is cooled and condensed in the syngas cooling train preheating the feedstock and other process streams.

In case of 100% ammonia feedstock, elimination and minimization of process steam is desired to maximize the thermal efficiency to maximize the hydrogen product to ammonia feed ratio. As a result, much less waste heat is available on the process side of the unit, which is insufficient for preheating and vaporizing the ammonia feedstock.

At the same time, less firing heat is required for cracking ammonia, so waste heat contained in the flue gas is less and is available only at lower temperatures A flow scheme for purely $NH_3$-based $H_2$ production is shown in FIG. 1. Ammonia is stored in a suitable storage vessel 1, preferably either as refrigerated fluid at −33° C. and ambient pressure or at elevated pressure and ambient temperature. The liquid $NH_3$ feed is moved by means of a liquid pump 3 against the system pressure (5-40 bar) into the SMR system, where it is bypassing potentially existing feed-pretreatment units 20, 40 (hydrogenation, $H_2S$ adsorption, pre-reforming), preheated in the $NH_3$ preheating section 10, 30 where $NH_3$ is vaporized and heated to suitable inlet conditions of 300-650° C. A part of the $NH_3$ stream may be used as fuel 45 in the SMR furnace 50 if the heating value of the waste gases from the PSA is not sufficient for heating the reaction. In addition, a part of the $H_2$ or the Syngas stream can be used as fuel as well in order to debottleneck the existing heat exchangers. The preheating can be done using a hot stream within the waste heat recovery section 10, 30, 90. For example, flue gas 54 can provide the heat energy for waste heat recovery section 30. While this feature is not shown in an effort to not further complicate the figures, the invention should not be so limited to what is show explicitly in the figures.

The preheated $NH_3$ feed 43 is directed into the SMR reactor 50, i.e. setup with a multitude of tubular reactors situated within a heated furnace. The tubes can be filled with standard reforming catalysts, e.g., based on Ni on $Al_2O_3$. In certain embodiments, the catalyst may be replaced by more active catalyst systems, especially for debottlenecking purposes. Within the SMR tubes, the $NH_3$ feed is converted into the product mixture at temperatures of 500-900° C. The gas mixture 53 comprises $N_2$ and $H_2$ as well as traces of unconverted $NH_3$ (e.g., up to about 5 vol %). The heat required for this reaction is provided indirectly through the SMR tube wall from the combustion in the firebox. The hot gas mixture 53 is cooled down in successive heat exchangers 10 and within the process gas boiler 90 by means of water vaporization. This generates steam as byproduct. The steam production can be adjusted by adjusting the load to the SMR firebox. For this purpose, additional $NH_3$ may need to be combusted.

In the embodiment shown, the gas mixture 53 bypasses the existing water gas shift reactor 60 and is cooled down in a series of waste heat recovery sections. Following the cooling, condensate 96 is removed from the cooled gas mixture 95 with the resulting dry gas mixture 101 being then sent to a water wash column that is configured to remove unreacted ammonia gas from the dry gas mixture by using pressurized water 84, preferably sourced from the boiler feed water 70. In one embodiment, the treatment section 102 can is a dedicated vessel that would be added to the existing SMR system.

In one embodiment, the treatment section can include a wash column placed in the existing syngas cooling section between the BFW Preheater outlet and the PSA inlet, i.e., below the dew point of the process gas 101, preferably between the final cooler and the PSA inlet. High pressure boiler feed water 84 from the existing units 70 will preferably be used for water dosing.

The treatment section can be designed for an inlet ammonia content in the range 0.2 to 5 mol %. As ammonia is very soluble in water, the water wash column can be designed and will reduce the remaining ammonia content in the feed to the PSA to a level below 100 ppm, preferably below 20 ppm and allow feeding the hydrogen and nitrogen mixture to the existing PSA.

The product gas 103 is sent to the pressure swing adsorption (PSA), where the $H_2$ is purified to typically >99.5% purity. The residual gas stream (off-gas) contains $H_2$, $N_2$ and $NH_3$. Wash column effluent stream 104 is withdrawn from the water wash column. In an optional embodiment, at least a portion 88 can be combined with the flue gas 54 of the SMR reactor 50

In an embodiment not shown, the off-gas stream from the PSA can be sent to the burners of the SMR in order to provide the heat required for the $NH_3$ decomposition reaction. The presence of a mixture of $H_2$ and $NH_3$ as combustible components is beneficial since the fast $H_2$ combustion and the slow $NH_3$ combustion balance each other and allow using state-of-the-art burners. In certain embodiments, at least 14% $H_2$ is present in the off-gas. In literature it is mentioned, that already 7-10% of $H_2$ are sufficient to allow a smooth co-combustion of $NH_3$ and $H_2$. This also allows additional combustion of NH3 fuel without suffering from slow $NH_3$ combustion.

In another embodiment not shown, the off-gas can be sent back to the SMR reactor tubes in order to more fully convert any residual ammonia, while also recovering additional residual hydrogen.

As noted in the background section, ammonia, particularly at elevated temperatures can cause embrittlement issues within the system. Certain embodiments of the present invention attempt to minimize these issues by using advantageous tie-in points for an existing SMR facility that allows for reduced CAPEX during the retrofit procedure.

Figure 3:
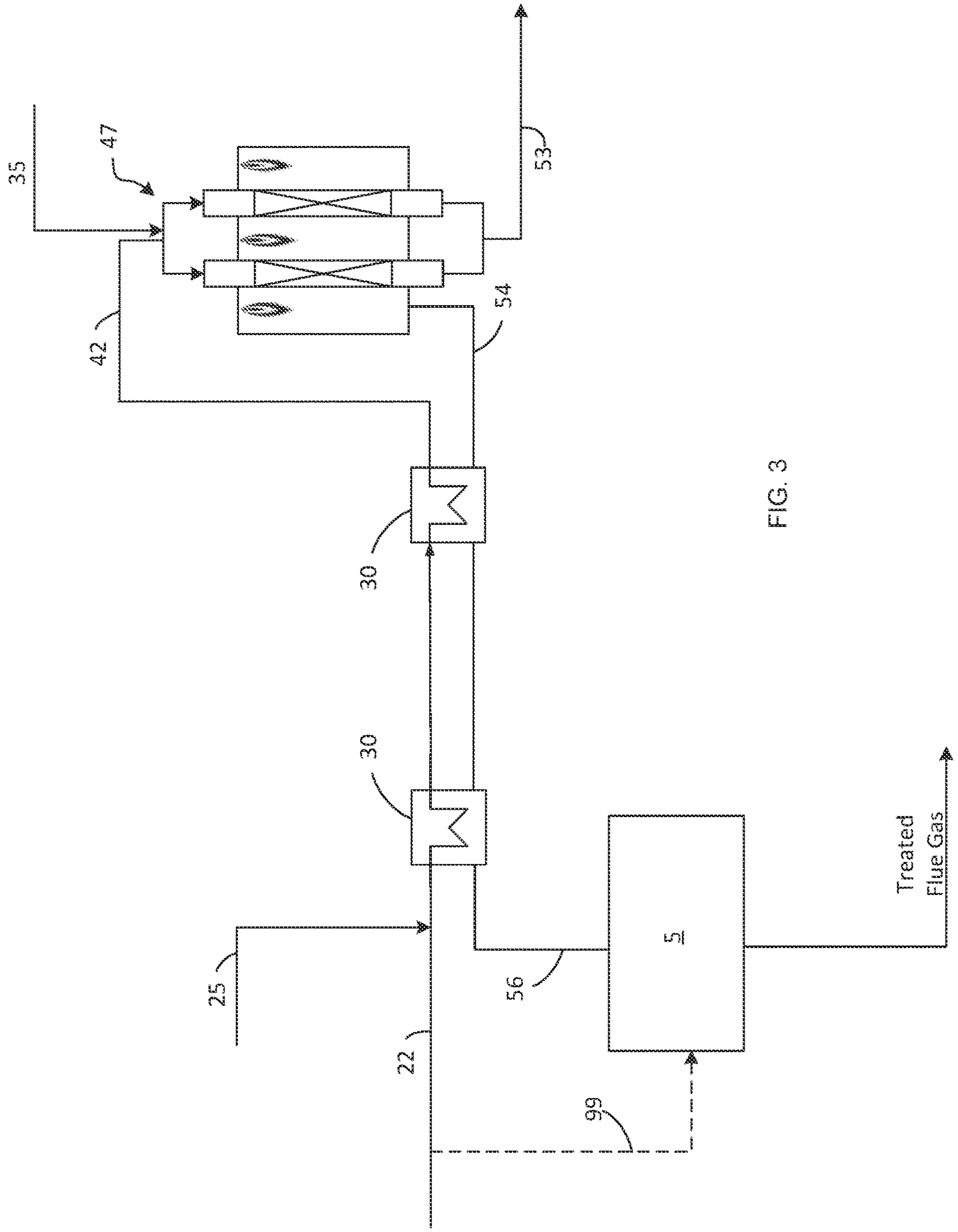
FIG. 3 provides an embodiment of the present invention.

FIG. 3 provides a simplified schematic representation of an embodiment of the present invention. Ammonia 22 is withdrawn from ammonia source 1 and pressurized in ammonia pump 3, preferably to a pressure of (5-40 bar) before being heating in waste heat recovery sections 30 to form preheated ammonia 42. As before, the preheated ammonia is sent to the reactor tubes of the SMR using a feed header 47 to distribute the ammonia gas 42 to all of the associated reactor tubes. Those of ordinary skill in the art will also recognize that a second header can be used to distribute the preheated ammonia 42 to the plurality of burners within the SMR as well. This feature is not shown in an effort to not overburden the figures.

In certain embodiments, the feed header is directly above the plurality of tubes, preferably within 10 meters.

Figure 2:
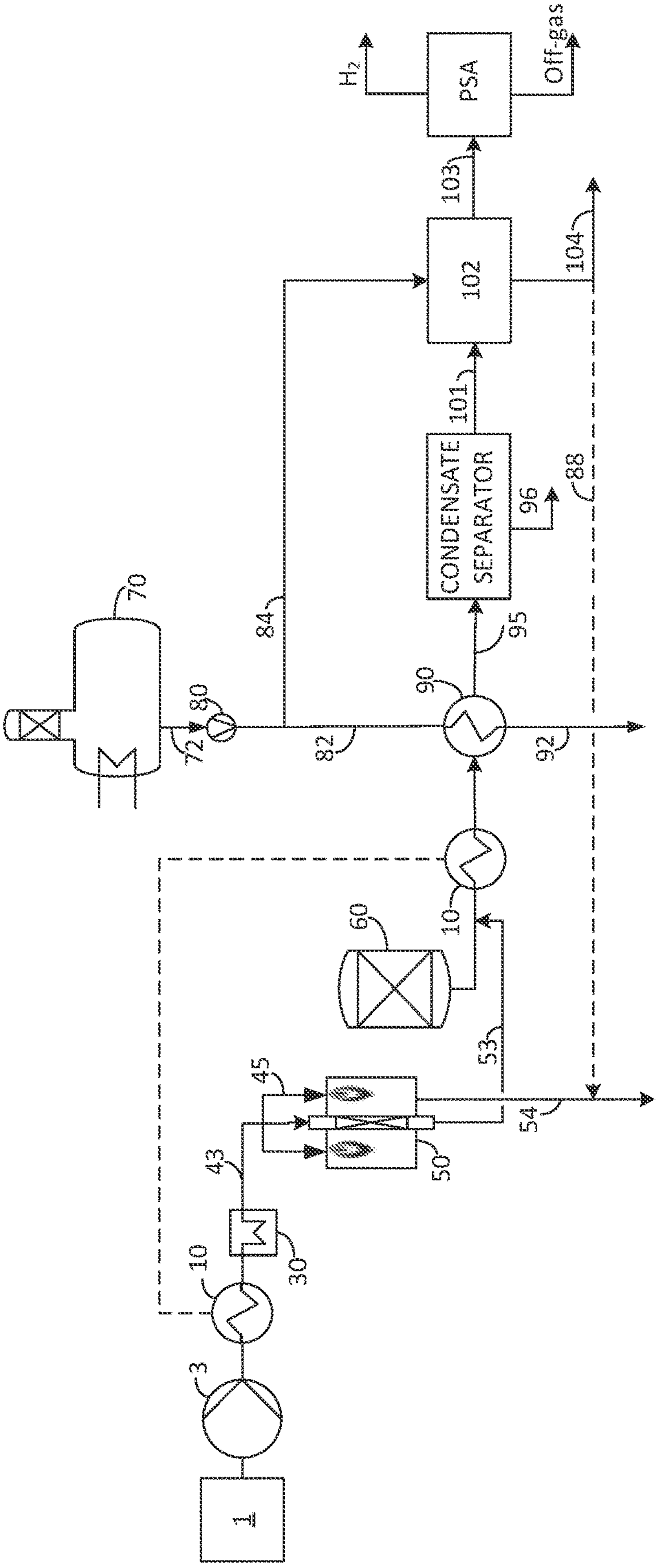
FIG. 2 provides a simplified schematic representation of an overall scheme for catalytic cracking of ammonia to produce hydrogen in accordance with an embodiment of the present invention.

Following the catalytic conversion of ammonia, the resulting mixed gas 53 is collected from the reactor tubes and then sent off for further processing. FIG. 2 provides non-limiting examples of further processing.

The flue gas 54 (i.e., the combustion product) can be redirected from the combustion chamber into the waste heat recovery section 30 (i.e., a series of heat exchangers), in which the heat is used to preheat and superheat various streams (e.g., combustion air, fuel, and feed). The untreated flue gas, which can contain NOx, can optionally be sent to flue gas treatment section 5 to form treated flue gas. In certain embodiments, the treatment section 5 can include a DeNOx unit and/or a selective catalytic reformer (SCR). Ammonia 99 can be used in both the DeNOx unit and the SCR.

Lines 25 and 35 represent appropriate tie in points that are in conformance with certain embodiments of the invention. Both tie-in points 25, 35 allow for bypassing most of the existing units (e.g., desulfurizer 20, pre-reformer 40), which thus greatly reduces potential embrittlement issues.

First tie-in point 25 can be located upstream of the first or second superheater coils that are part of the waste heat recovery section 30. The second tie-in point 35 can be located at, or just upstream the feed cross header 47. By using either one of these tie-in points, very little piping or equipment will need to be revamped using appropriate surface treatments.

In an additional embodiment, the pressure and temperature in the reactor tubes can be chosen that downstream of the reactor tubes, the ammonia content in mixed gas 53 is less than 2.5 mol %, which greatly reduces the risk of nitride formation and embrittlement issues for the downstream equipment. Suitable pressures can be 15-40 bar (a), preferably 20-35 bar (a), while suitable temperatures can be 600-850° C., preferably 650-750° C.

In light of the above, in certain embodiments of the present invention, in order to retrofit an existing SMR, additional equipment such as an ammonia hold-up vessel or tank and ammonia feed pump can be included. This is particularly true in the event that the ammonia feed can be provided at sufficient pressures and in vaporized form. In the event tie-in point 35 is used, it is preferable to heat the ammonia stream at a point between the ammonia pump and the feed header 47.

Figure 4:
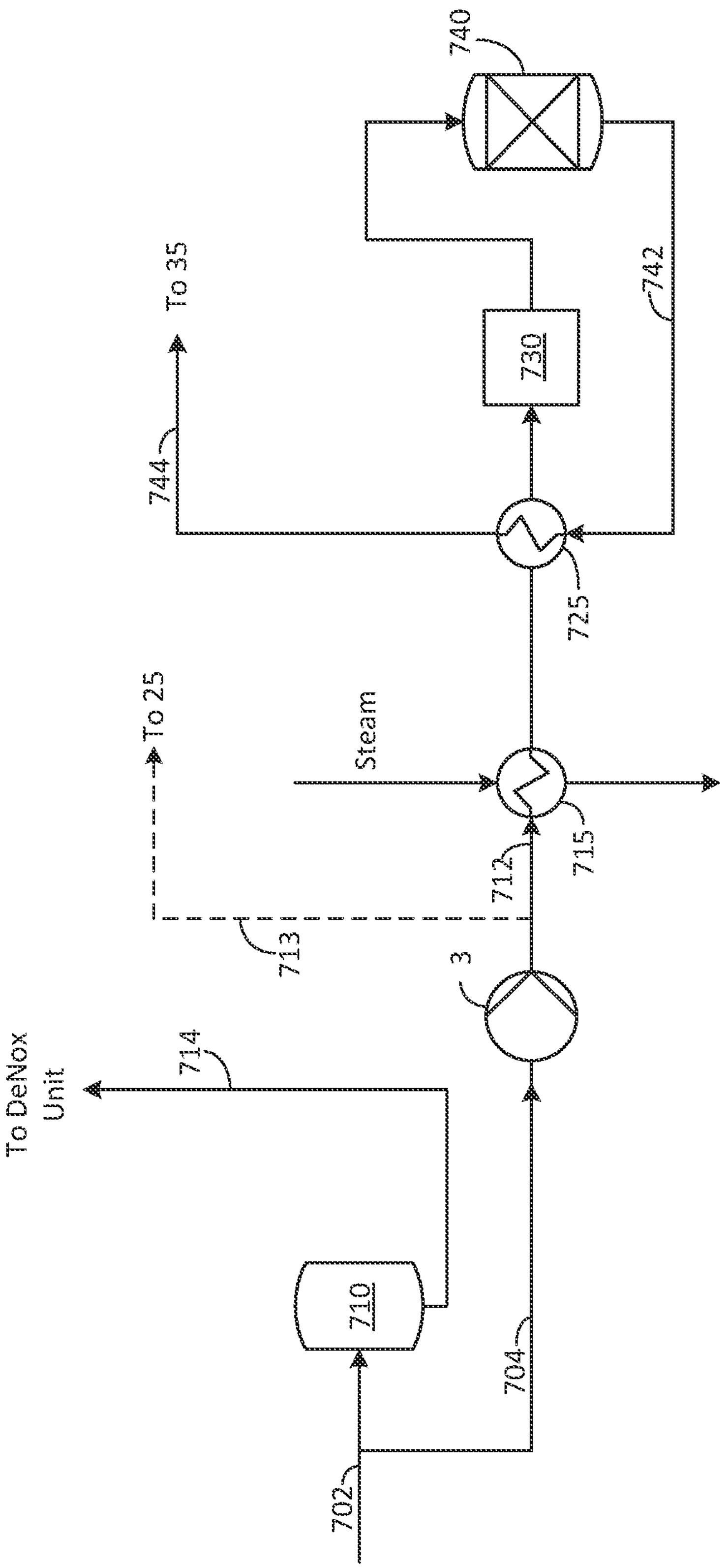
FIG. 4 provides equipment layouts for an embodiment of the present invention.

FIG. 4 provides a schematic representation of additional equipment that can be included with the revamped SMR facility. This embodiment can include ammonia hold-up vessel 710, ammonia feed pump 3, ammonia pre-heater 715, ammonia interchanger 725, ammonia vaporizer 730, and pre-reactor 740.

The ammonia vaporizer 730 and preheater 715 can be electrically heated, steam heated or heated by a process stream downstream of the existing process gas boiler or heated by the flue gas stream downstream of the existing flue gas boiler. The temperature range of the hot medium for the preheating/vaporizing step can be below 400° C., preferably below 300° C. The ammonia interchanger 730 and/or pre-reactor 740 can be arranged as shown in FIG. 4.

In the embodiment shown, first portion of liquid ammonia 702 is introduced into ammonia hold-up vessel 710, before being sent to a DeNox unit via line 714. Second portion of liquid ammonia 704 is compressed in ammonia feed pump 3. Following compression, the compressed liquid ammonia can then be tied into the retroffited SMR plant via tie-in point 25 via line 713, or to tie-in point 35. As tie-in point 25 is upstream of the existing heaters, the pressurized liquid ammonia 713 does not separate means of heating from ammonia pre-heater 715, ammonia interchanger 725, or ammonia vaporizer 730.

In certain embodiments in which tie-in point 35 is desired (e.g., immediately upstream the SMR tubes), then the compressed liquid ammonia 712 can be heated in ammonia pre-heater 715, ammonia interchanger 725, and then vaporized in ammonia vaporizer 730 before undergoing a pre-reaction conversion in ammonia pre-reactor 740. The resulting pre-reacted ammonia stream 742 is used to provide pre-heating energy in ammonia interchanger 725, before being sent to tie-in point 35 via line 744.

Notwithstanding the above, those of ordinary skill in the art will recognize that the equipment shown in FIG. 4 is not required in certain embodiments of the invention. Specifically, all of the additional equipment can be omitted if the ammonia is supplied pressurized and in vapor form, which means that the process steps of pressurization and vaporization occur outside of the battery limits of the existing unit.

In certain embodiments, a nitridation protective layer can be applied to certain pieces of equipment. The nitridation protective layer can be selected from the group consisting of a protective liner material that is mechanically coupled to the inner surface, an aluminization layer applied to the inner surface, a diffusion barrier layer in conjunction with the aluminization layer applied to the inner surface, wherein the diffusion barrier layer is disposed between the inner surface and the aluminization layer, and a weld-overlay applied to the inner surface. A more detailed discussion of acceptable nitridation protective layers can be found in co-pending U.S. application Ser. No. 17/896,026, filed on Aug. 25, 2022, which is incorporated by reference in its entirety.

Cracking ammonia in an existing SMR poses several challenges:

1) the lower heating value of ammonia (18.6 MJ/kg) relative to natural gas (42-55 MJ/kg), that would result in considerably higher fuel and air flow rates in the furnace for a given duty;
2) the existing heat exchangers might not have the required heat exchange surface;
3) as reported in various studies, a temperature higher than 500° C. is required for catalytic $NH_3$ decomposition (Wang et al., Ammonia as hydrogen carrier for transportation; investigation of the ammonia exhaust gas fuel reforming, p. 9908). It is thus desirable to reach this T at the inlet to the reformer/cracker. The switch from steam methane reforming to $NH_3$ cracking entails lower duties and temperatures, and upends the heat integration, with the consequence that it can be challenging to reach this T threshold;
4) undesirable nitride formation is much more prevalent above temperatures of 600° C. In the high temperatures in an SMR reformer (typically more than 850° C. at the outlet) nitridation could become a major issue;
5) non-optimized layout of existing equipment could lead to over-consumption of ammonia; and
6) discrepancy between the SMR being optimized with respect to $H_2$ and steam production and the $NH_3$ cracking system that actually could be operated fully without steam.

The aforementioned challenges can be overcome by various alternative embodiments of the present invention. For example, In one embodiment having a cracking T of 800° C., a part of the $H_2$ production can be used as fuel ($H_2$ fueling), so as to meet the original design flow rates in the furnace and flue gas system, and achieve a better fit with the existing heat exchangers (problems 1 and 2).

$H_2$ fueling alone is insufficient, however, since reaching a T of at least 500° C. at the cracker inlet is difficult. To overcome this issue, an additional one or more heat exchangers can be added. In certain embodiments, the first heat exchanger is installed on the converted $H_2$ upstream of the PSA, to make use of low grade heat (~140° C.) to vaporize the ammonia and simultaneously use liquid ammonia as a low temperature cooling medium for the final raw $H_2$ cooling. This low grade heat is traditionally considered to be waste heat on an SMR. (problem 3)

Optionally, a second heat exchanger can be installed on one of the SMR steam systems, either directly downstream of an existing boiler, or downstream of a steam superheater. This second heat exchanger allows for optimizing of the heat integration on the SMR without perturbing the main process, resulting in an overall reduced $NH_3$ consumption (problem 5).

The use of $H_2$ as the main fuel is more challenging than natural gas combustion, but is in general well understood, in part due to the experience of the use of PSA off-gas as fuel in SMRs. In contrast to $NH_3$ combustion, which is challenging due to its low flame speed, $H_2$ combustion is not as critical in this respect since its combustion is much faster than for natural gas or $NH_3$.

In another embodiment having a cracking T of 600° C., a similar configuration proves to be advantageous: a limited amount of $H_2$ fueling allows for matching of the existing heat exchanger setup and to reduce the duty and space velocity in the $NH_3$ cracker correspondingly; and the addition of a heat exchanger on the raw $H_2$ upstream of the PSA, and a heat exchanger on the steam system allows us to reach the required cracker inlet T of 500° C. (problem 3), while reducing the ammonia consumption by 5-10% (problem 5).

In this embodiment, $H_2$ is co-combusted with $NH_3$ (roughly 50:50 by LHV), yielding a fuel mixture with combustion properties that are easier to handle than pure $H_2$ or pure $NH_3$ combustion. Moreover, the risks of nitridation-induced material degradation are reduced significantly at this lower cracking T (problem 4)

Finally, as an advantage of these aforementioned embodiments, the volume flow rates on the process line are lower than with an SMR. In the event that green ammonia is being used, and that the existing plant is connected to an $H_2$ pipeline, the green $H_2$ production could be increased beyond what was possible with steam methane reforming, and another SMR on the same pipeline could reduce its production, thereby improving the overall carbon intensity of the $H_2$ on the pipeline.

Figure 5:
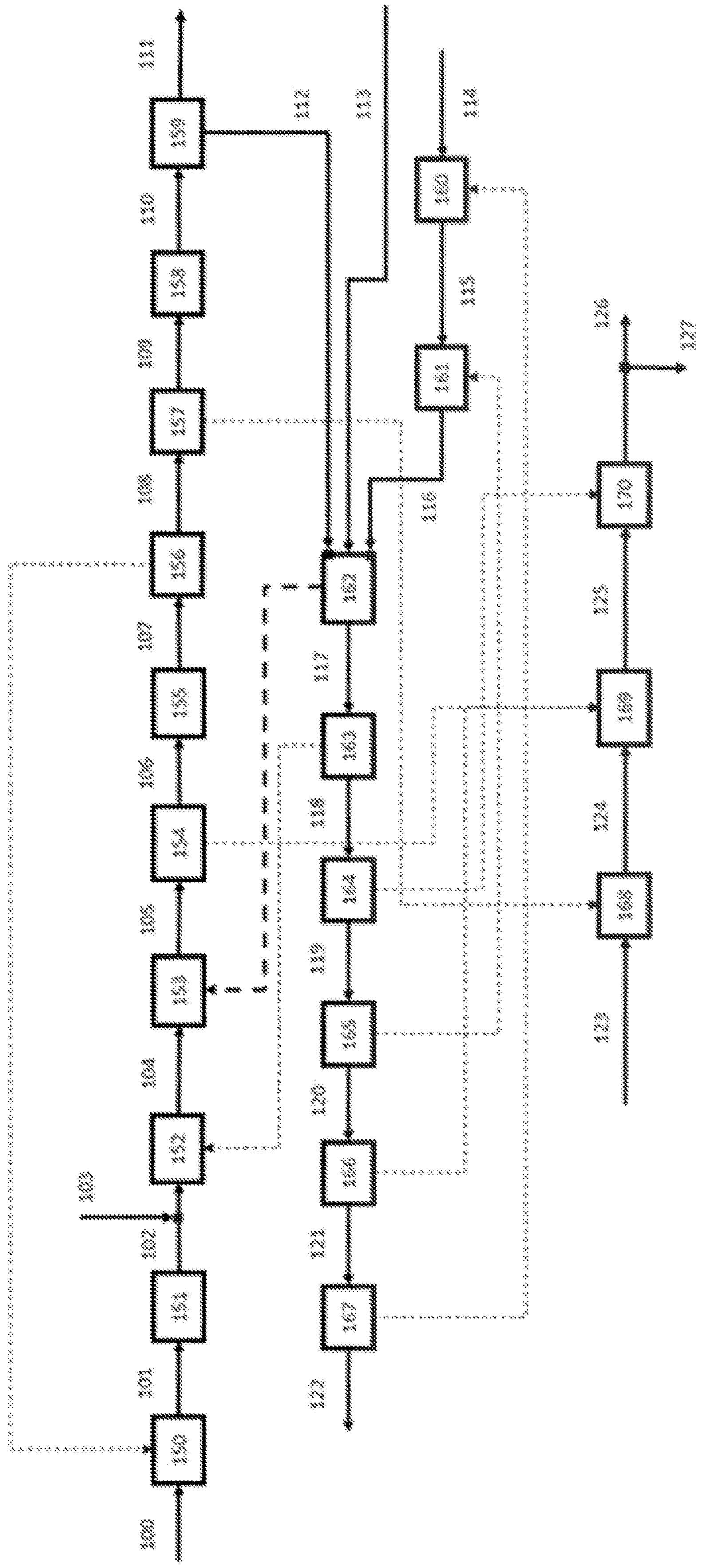
FIG. 5 provides another embodiment of the present invention.

The reference case of the SMR, Case 1*a*, is described in FIG. 5. The process natural gas 100 is pre-heated in heat exchanger 150, is desulfurized in 151, mixed with steam 103 before being heated to ~650° C. in the reformer feed pre-heater 152. The steam methane reforming reaction takes place in catalyst filled tubes of the reformer 153, at an outlet reforming temperature of 850-900° C. The hot syngas is used to vaporize steam in the process gas boiler 154/169, before being sent to a water gas shift reactor 155. The shifted syngas 107 is used to pre-heat the natural gas in 156/150, and is subsequently cooled in the boiler feed water heater 157/168 to a temperature of ~110° C. The syngas 109 is then cooled by air coolers and a final cooler in the heat exchange apparatus 158, before being sent to the PSA, from which an $H_2$ stream with high purity (99.9%) 111 is recovered.

The PSA off-gas 112, composed of $CO_2$, $H_2$, as well as unreacted CO & $CH_4$ is sent to the burners of the reformer furnace 162, where it is mixed and combusted with natural gas fuel 113, and hot combustion air 116. Part of the heat generated in the furnace is used in the endothermic reforming reaction in 153. The remaining heat in the flue gas 117 is then successively used to heat the reformer feed in 163/152, superheat steam in 164/170, heat the combustion air in 165/161, generate steam in the flue gas boiler 166/169, and pre-heat the combustion air in 167/160

In this specific SMR, for the sake of simplification, we consider a common steam system for the process gas and flue gas. The boiler feed water 123 is pre-heated by shifted syngas in 168, vaporized in the boiler 169 by the process gas 105 and flue gas 119, and superheated in 170 by the shifted syngas 108. The required amount of steam 127 is then mixed with the process natural gas 102, and the remaining steam 126 is exported as a co-product.

Figure 6:
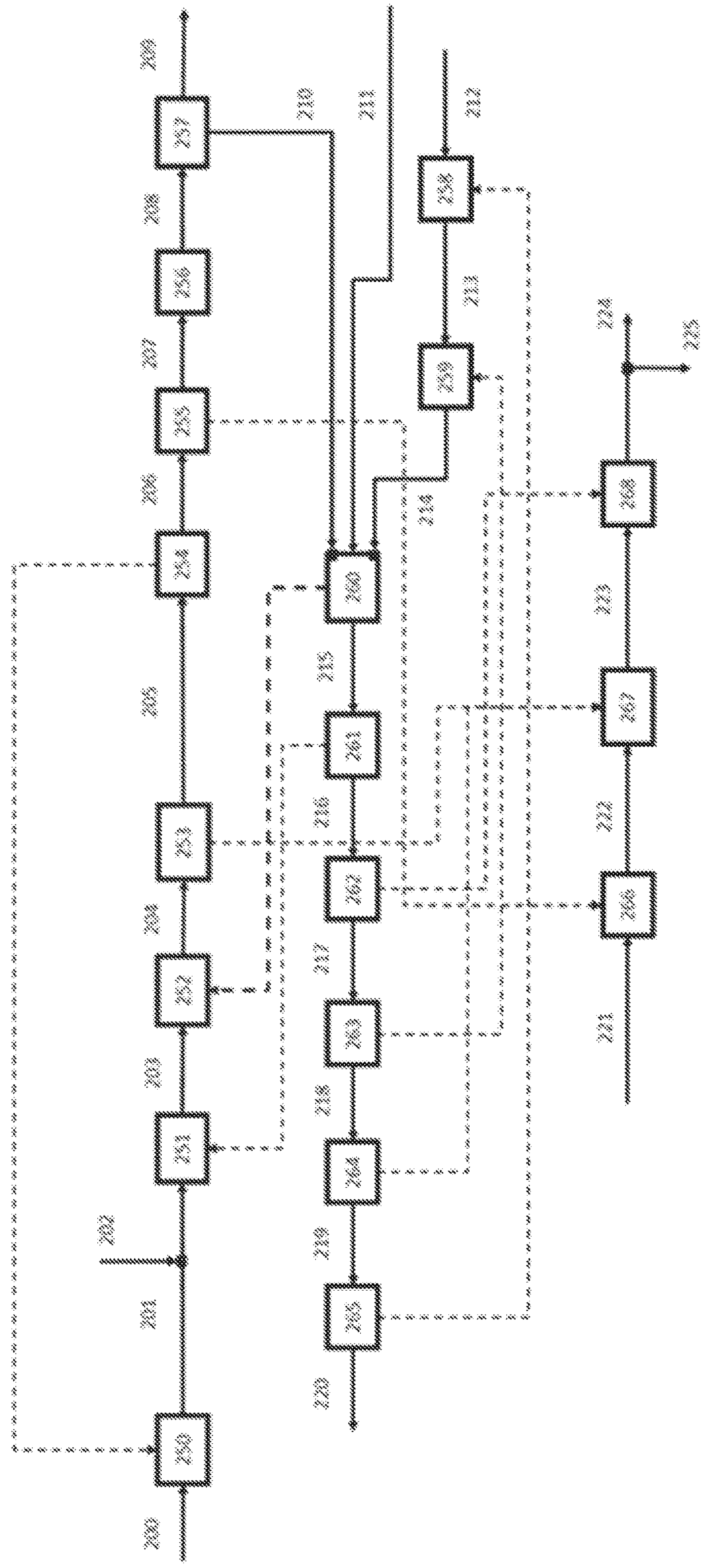
FIG. 6 provides another embodiment of the present invention.

In Case 1*b*, which is shown in FIG. 6, $NH_3$ is used as the process feedstock 200 and as the fuel 211. The desulfurizer 151 and water gas shift reactor 155 are no longer needed and therefore bypassed. A small amount of the steam generated may be used as process steam 225/202, to mitigate the risks or nitridation-induced corrosion downstream in the process. For the rest, the heat exchanger arrangement is similar to that of Case 1*a*.

The $H_2$ production matches that of the SMR base case, and the steam production is similar to that of the base case, with the exception that here nearly all the steam produced is exported. The fit with the existing SMR is quite poor, however (see Table 1). Owing to the low LHV of $NH_3$ as fuel compared to NG, the molar flow rate of $NH_3$ is considerably higher, with the consequence that the combustion air flow rate and flue gas volume flow rate at the reformer outlet have increased by a factor of 2.5 and 2.4 respectively. The required heat exchange surfaces have more than doubled for heat exchangers E-F1 "reformer feed heater", E-F4 "hot air combustion heater", E-F5 "flue gas boiler" and E-F6 "cold air combustion heater" (Table 1).

In an alternative embodiment of Case 1*c*, we keep the same arrangement as in FIG. 6, but reduce the cracking temperature to 800° C., and increase the hot combustion air temperature to 480° C. in an attempt to reduce the required amount of $NH_3$ as fuel. The increase in combustion air temperature leads to a stark drop in steam export relative to Case 1*b*, and the steam export flow rate is now in line with that of the base case. The molar flow rate of $NH_3$ fuel, flue gas volume flow rate and combustion air mass flow rate drop significantly compared to Case 1*b*, but remain too high relative to the base case. While the required heat exchange surface now fits for E-F5 "flue gas boiler", E-F1 and E-F6 remain undersized, and the fit with E-F4 has gotten worse.

Figure 7:
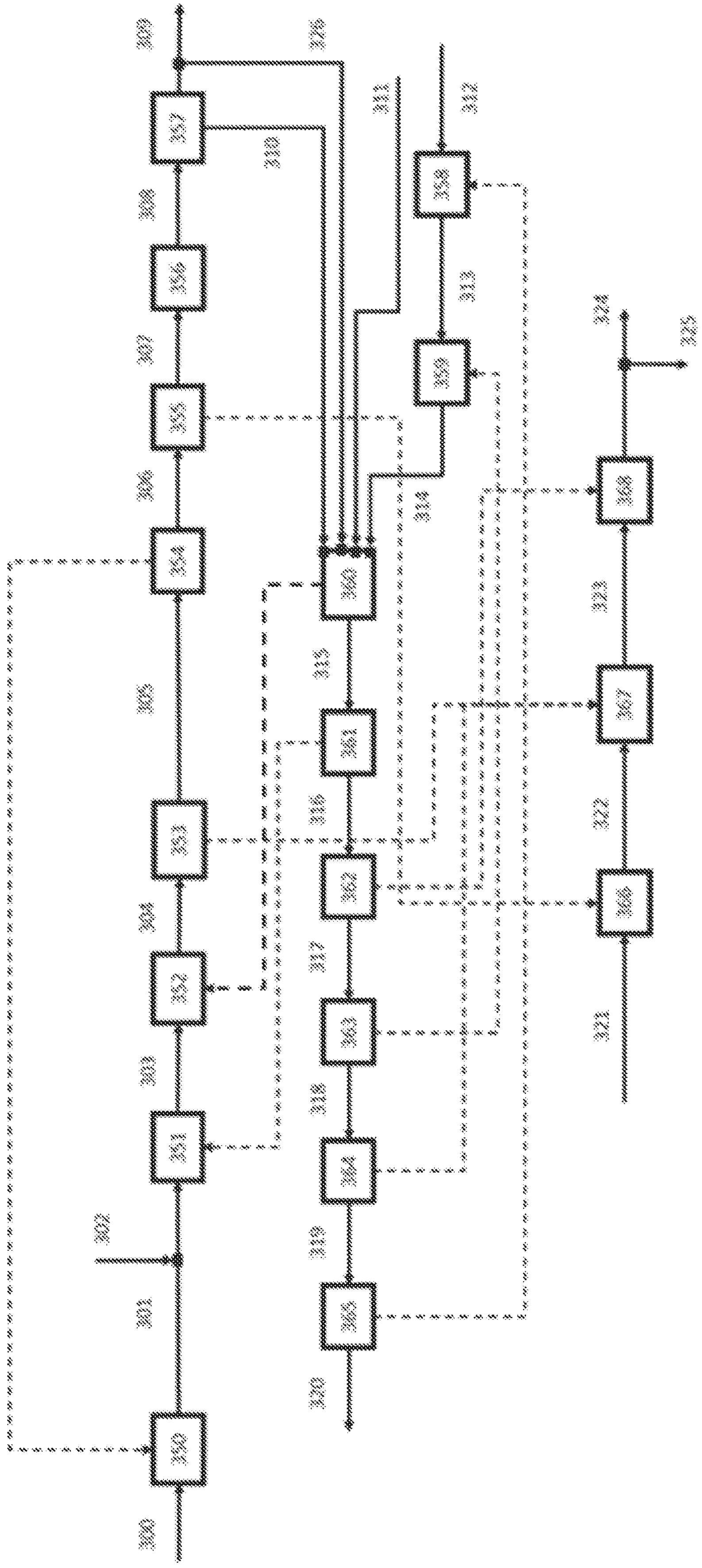
FIG. 7 provides another embodiment of the present invention.

In Case 1*d* (see FIG. 7), we keep the same setup as in Case 1*b* and 1*c*, but now divert part of the $H_2$ product 326 to use as fuel. The combustion air and flue gas flow rate match the SMR base case much better. The hot combustion air temperature can now be reduced, with the consequence that E-F4 fits better with the base case. With the lower flue gas temperatures than on the SMR, however, E-F3 is now undersized, and in spite of a reduction in the cracker inlet T, E-F1 is also undersized. In FIG. 7, a part of the purified $H_2$ product recovered from the PSA can be preferably sent to the fuel.

Alternatively, a similar "$H_2$ fueling" effect can be obtained by taking part of the raw $H_2$ upstream of the PSA, or modifying the PSA to degrade the $H_2$ recovery, such that the required quantity of $H_2$ for fuel is contained in the PSA off-gas 310. In Table 1, we provide the molar flow rate of $H_2$ sent to the fuel (excluding the $H_2$ molar flow rate already present in the PSA off-gas), corresponding to the setup described in FIG. 7. To account for the alternatives where the $H_2$ contribution to the fuel is provided upstream of the PSA, or through the PSA off-gas, we also include an "$H_2$ fuel ratio" in Table 1, $\eta H_2 f$, defined as follows:

$$\frac{\text{sum of all } H2 \text{ mole flow rates to fuel}\left(\text{kmol } H2/\text{h}\right)}{H2 \text{ mole flow rate at cracker outlet}\left(\text{kmol}\frac{H2}{\text{h}}\right)} \quad (1)$$

Figure 8:
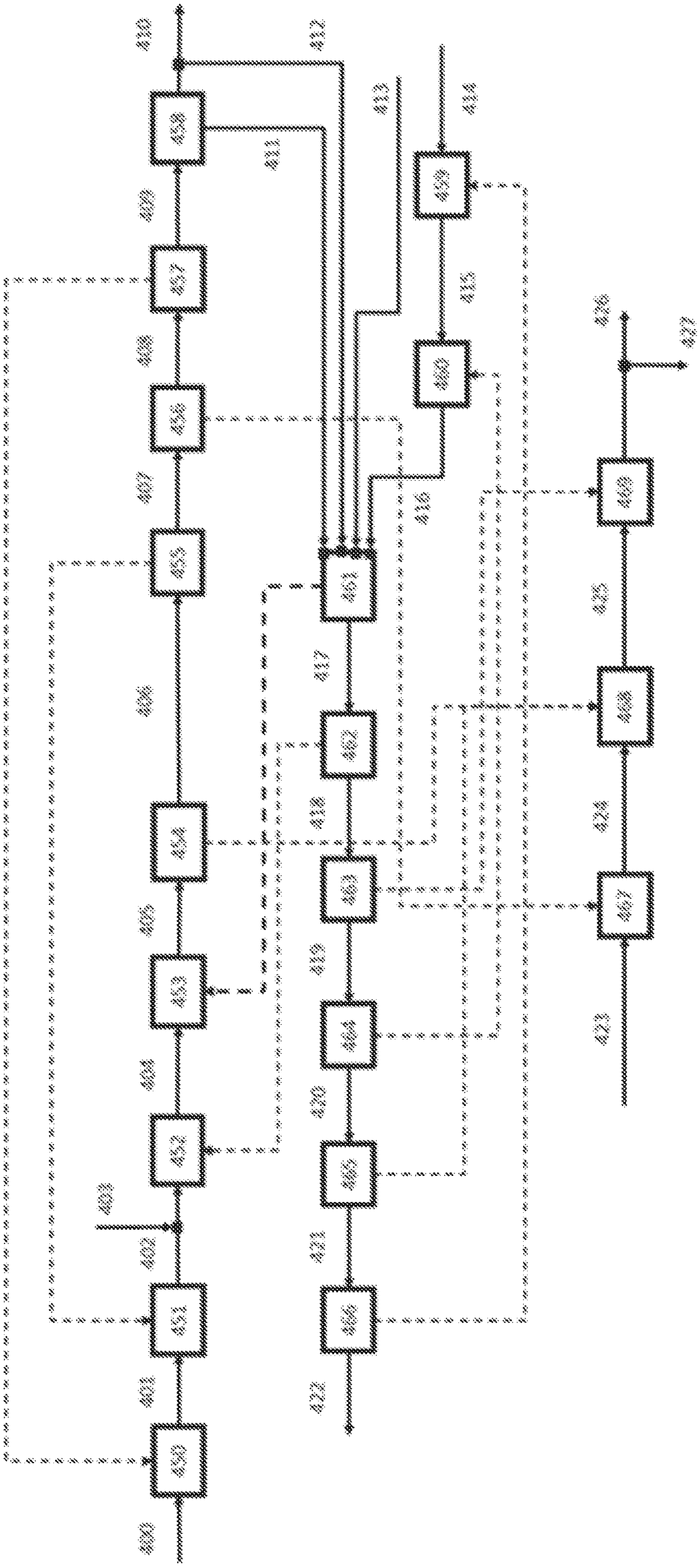
FIG. 8 provides another embodiment of the present invention.

In Case 1*e* (see FIG. 8), we add a new heat exchanger 457 on the raw $H_2$ upstream of the PSA and an extra $NH_3$ heater 450, since what is traditionally considered to be waste heat on an SMR can now be used to vaporize the process $NH_3$. The heat integration is further improved, the steam export increases, and E-F3 provides a better fit with the Base case. On the downside, E-F1 is still undersized, in spite of a low cracker inlet T of 400° C. At a cracker inlet T below 500° C., the kinetics of the cracking reaction could be poor in the first part of the reformer tubes, which would then effectively be used as a heat exchanger section rather than a reactor.

In Case 1*f* (see FIG. 9), we add another heat exchanger 571/552, which uses part of the steam production 529 to vaporize and pre-heat the $NH_3$ feedstock further. The steam export is reduced, but the heat integration is improved significantly. The quantity of $H_2$ required as fuel drops compared to Case 1*e*, and the overall $NH_3$ consumption is reduced. The cracker inlet T has been increased beyond the threshold of 500° C., and the fit with the Base case is now satisfactory, as not a single heat exchanger is undersized.

Further, in the event of a desired increase in the $H_2$ production capacity beyond that of the original SMR, the bottleneck on the heat exchangers would lie in E-F1. One can simply increase the duty on the new heat exchanger 571 on the steam system, however, to lower the duty on E-F1 correspondingly.

Figure 10:
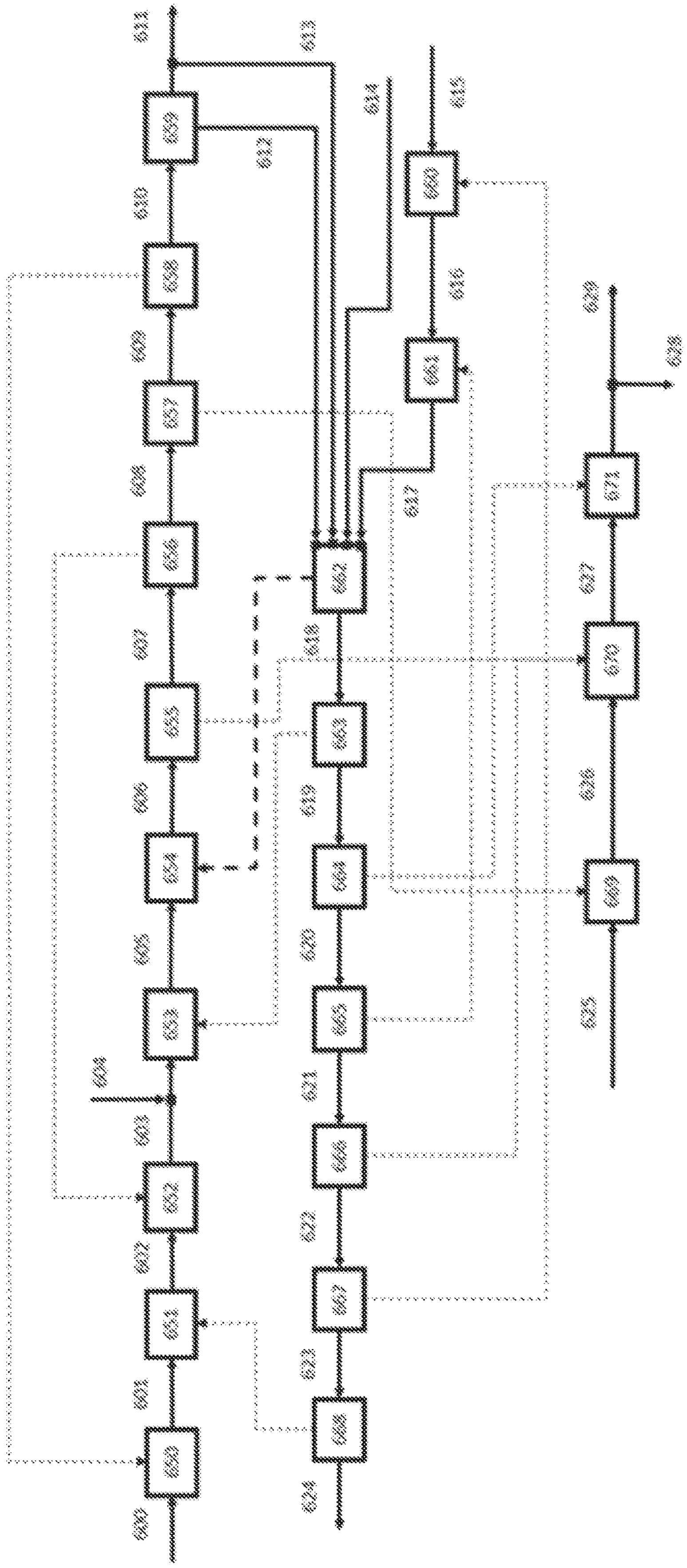
FIG. 10 provides another embodiment of the present invention.

Another similar configuration is described in FIG. 10. On an SMR the flue gas at the stack (stream 122 in FIG. 5), has to be kept above the dew point of sulfuric acid to avoid corrosion, with the consequence that the flue gas is emitted at a T of ~140° C. With $NH_3$ as feedstock and fuel this constraint would no longer be applicable, so that a heat exchanger 668/651 could be installed to make use of this low grade heat in the flue gas to vaporize the $NH_3$ feed. The advantage here is that there would be no reduction in steam export, albeit without the flexibility provided by the heat exchanger on the steam system. In such a case, given the similar temperature levels of the raw $H_2$ 609 and flue gas 623, the heat exchangers/$NH_3$ vaporizers 658/650 and 668/651 could be combined into a single piece of equipment.

One of the main uncertainties in the use of an existing SMR to crack $NH_3$ would lie in the achievable flue gas temperature at the outlet of the cracker (the so-called "bridge-wall temperature"), which can affect the entire process heat integration and is mainly dominated by the overall heat transfer within the furnace and the SMR tubes. Cases 1*g* and 1*h* use the same setup as Case 1*f*, with variations in the bridge-wall temperature of −50° C. or +50° C. respectively. As Table 1 illustrates, these variations are easily compensated by adjusting the portion of the $H_2$ product that is used as fuel, and the rest of the key process parameters and required heat exchange surfaces are unaffected. This $H_2$ fueling setup thus provides a robust control parameter with which to ensure the process parameters stay in acceptable ranges.

Formation of undesirable nitrides is much more prevalent above temperatures of 600° C. At cracking temperatures of 800° C., nitridation could become a major issue, requiring costly mitigation measures (e.g. as described supra"). Furthermore, a high cracking temperature implies a higher duty on the reformer/cracker, and thus a higher overall consumption of $NH_3$.

Figure 9:
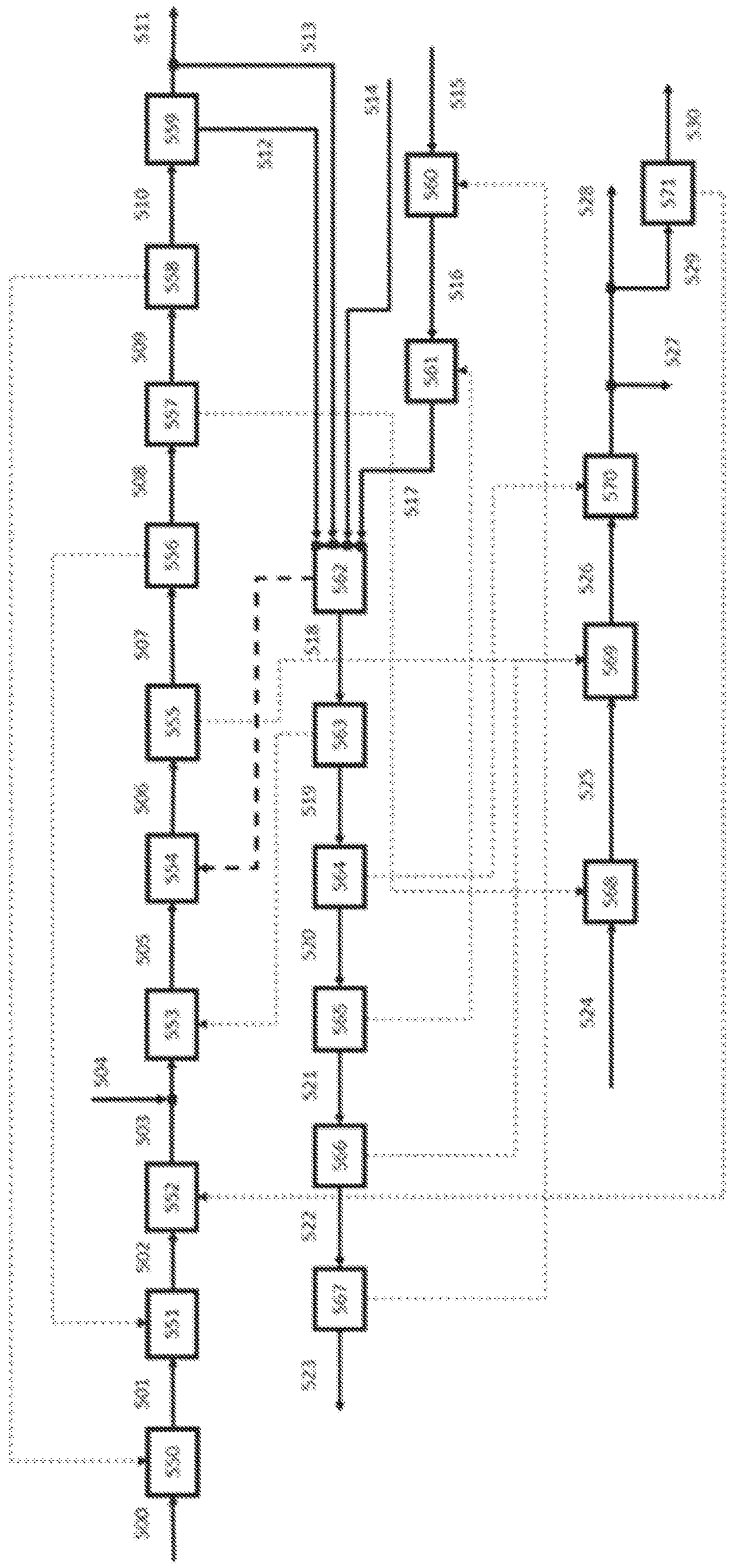
FIG. 9 provides another embodiment of the present invention.

In Case 2*b* (see Table 2), we replicate the setup of FIG. 9, with $H_2$ fueling, and the additional heat exchangers 558/550 on the raw $H_2$ and 571/552 on the steam system to vaporize and pre-heat the NH3 feedstock. albeit at a cracking T of 600° C. A greater quantity of $NH_3$ fuel is required compared to Case 1*f*, but the required portion of the $H_2$ production sent to fuel drops drastically, with the consequence that the overall $NH_3$ consumption is reduced. Once again, with this flexible setup, the requirements on the process parameters (Cracker inlet T>500° C.) and heat exchanger areas can be satisfied, in spite of the significantly lower cracking T relative to the SMR. Cases 2*c* and 2*d*, with bridge-wall temperature variations of −50° C. and +50° C. respectively, show that once again any changes or uncertainties in the bridge-wall temperature can easily be compensated by the amount of $H_2$ product used as fuel.

TABLE 1

SMR base case, and NH3 cracking cases at cracking T > 800° C.

| | Case 1a Base case - SMR | Case 1b NH3 cracking T crck 850° C. | Case 1c NH3 cracking T crck 800° C. | Case 1d NH3 cracking T crck 800° C. - H2 fueling | Case 1e NH3 cracking T crck 800° C. - H2 fueling - E-R4 for NH3 pre-heating | Case 1f NH3 cracking T crck 800° C. - H2 fueling - E-R4 for NH3 pre-heating - E-stm for NH3 pre-heating | Case 1g = Case 1f with lower BWT | Case 1h = Case 1f with higher BWT |
|---|---|---|---|---|---|---|---|---|
| Products/feedstock/fuel | | | | | | | | |
| H2 prod (Nm3/h) | 100000 | 100000 | 100000 | 100000 | 100000 | 100000 | 100000 | 100000 |
| Steam export (kg/h) | 80541 | 172127 | 86257 | 87082 | 96023 | 56658 | 47761 | 68740 |
| NG/NH3 feed (kmol/h) | 1520 | 3517 | 3523 | 4608 | 4608 | 4254 | 4160 | 4340 |
| NG/NH3 fuel (kmol/h) | 361 | 1924 | 1131 | 162 | 162 | 121 | 125 | 153 |
| NG/NH3 total (kmol/h) | 1880 | 5441 | 4654 | 4770 | 4770 | 4375 | 4285 | 4494 |
| Key process parameters | | | | | | | | |
| T cracking (° C.) | 900 | 850 | 800 | 800 | 800 | 800 | 800 | 800 |
| dT-cracker (Bridge-wall T − cracking T) | 150 | 150 | 150 | 150 | 150 | 150 | 100 | 200 |
| H2 fuel (kmol/h) | 0 | 0 | 0 | 1615 | 1615 | 1089 | 948 | 1217 |
| ηH2f − as defined in (1) (in %) | 12.5% | 15.0% | 15.0% | 35.0% | 35.0% | 29.6% | 28.0% | 31.0% |
| Cracker inlet T (° C.) | 650 | 650 | 550 | 400 | 400 | 620 | 620 | 620 |
| Vol flow rate at cracker inlet (m3/h) | 17046 | 10104 | 9002 | 9545 | 9545 | 11821 | 11558 | 12060 |
| Hot combustion air T (° C.) | 380 | 380 | 480 | 320 | 320 | 380 | 380 | 380 |
| Combustion air mass flow rate (kg/h) | 224039 | 562627 | 358383 | 228596 | 228596 | 178223 | 168747 | 196251 |
| Vol flow rate at E-F1 inlet (m3/h) | 889932 | 2120976 | 1345699 | 979894 | 979894 | 791614 | 723665 | 891596 |
| LHV of NG/NH3 fuel as % total LHV to furnace | 45% | 76% | 64% | 8% | 8% | 8% | 8% | 9% |
| Heat exchanger areas (calculated) | | | | | | | | |
| E-R1 process gas boiler (m2) | 390 | 200 | 204 | 290 | 283 | 252 | 248 | 254 |
| E-R3 BFW heater (m2) | 360 | 86 | 103 | 171 | 161 | 135 | 134 | 133 |
| E-F1 reformer/cracker feed heater (m2) | | | | | | | | |
| E-F3 steam superheater (m2) | 684 | 644 | 452 | 935 | 746 | 524 | 540 | 503 |
| E-F4 hot air combustion heater (m2) | | | | | | | | |
| E-F5 flue gas boiler (m2) | 6619 | 15263 | 6802 | 3918 | 5044 | 5534 | 4987 | 6469 |
| E-F6 cold air combustion heater (m2) | | | | | | | | |

TABLE 2

SMR base case, and NH3 cracking cases at cracking T = 600° C.

| | Case 2a Base case - SMR | Case 2b NH3 cracking T crck 600° C. - H2 fueling - E-R4 for NH3 pre-heating - E-stm for NH3 pre-heating | Case 2c = Case 2b with lower BWT | Case 2d = Case 2b with higher BWT |
|---|---|---|---|---|
| Products/feedstock/fuel | | | | |
| H2 prod (Nm3/h) | 100000 | 100000 | 100000 | 100000 |
| Steam export (kg/h) | 80541 | 28054 | 22089 | 36171 |

TABLE 2-continued

SMR base case, and NH3 cracking cases at cracking T = 600° C.

| | Case 2a Base case - SMR | Case 2b NH3 cracking T crck 600° C. - H2 fueling - E-R4 for NH3 pre-heating - E-stm for NH3 pre-heating | Case 2c = Case 2b with lower BWT | Case 2d = Case 2b with higher BWT |
|---|---|---|---|---|
| NG/NH3 feed (kmol/h) | 1520 | 3603 | 3520 | 3690 |
| NG/NH3 fuel (kmol/h) | 361 | 456 | 477 | 450 |
| NG/NH3 total (kmol/h) | 1880 | 4059 | 3997 | 4140 |
| Key process parameters | | | | |
| T cracking (° C.) | 900 | 600 | 600 | 600 |
| dT-cracker (Bridge-wall T - cracking T) | 150 | 150 | 100 | 200 |
| H2 fuel (kmol/h) | 0 | 150 | 29 | 276 |
| ηH2f - as defined in (1) (in %) | 12.5% | 15.0% | 13.0% | 17.0% |
| Cracker inlet T (° C.) | 650 | 550 | 539 | 550 |
| Vol flow rate at cracker inlet (m3/h) | 17046 | 9209 | 8868 | 9431 |
| Hot combustion air T (° C.) | 380 | 320 | 320 | 320 |
| Combustion air mass flow rate (kg/h) | 224039 | 203679 | 199645 | 212360 |
| Vol flow rate at E-F1 inlet (m3/h) | 889932 | 696301 | 647789 | 760034 |
| LHV of NG/NH3 fuel as % total LHV to furnace | 45% | 39% | 44% | 36% |
| Heat exchanger areas (calculated) | | | | |
| E-R1 process gas boiler (m2) | 390 | 167 | 165 | 168 |
| E-R3 BFW heater (m2) | 360 | 124 | 125 | 121 |
| E-F1 reformer/cracker feed heater (m2) | 547 | 546 | 544 | 479 |
| E-F3 steam superheater (m2) | 684 | 515 | 544 | 486 |
| E-F4 hot air combustion heater (m2) | 865 | 492 | 537 | 447 |
| E-F5 flue gas boiler (m2) | 6619 | 5110 | 4699 | 5730 |
| E-F6 cold air combustion heater (m2) | 10623 | 9346 | 9189 | 9754 |

As used herein, "immediately upstream the SMR tubes" is meant to encompass a situation in which the feed distribution system is directly above the plurality of tubes, or within a maximum of 10 m above based on the pigtail length, connecting the distribution system (manifolds) with the SMR tubes.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps or devices can be combined into a single step/device.

The singular forms "a", "an", and "the" include plural referents, unless the context clearly dictates otherwise. The terms about/approximately a particular value include that particular value plus or minus 10%, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A method for producing hydrogen in an existing steam methane reformer (SMR) via ammonia cracking, the SMR comprising a furnace and a pressure swing adsorption (PSA) unit, wherein the furnace has a plurality of SMR tubes and a plurality of burners, the method comprising the steps of:

(a) providing a gaseous stream consisting essentially of ammonia at a temperature of at least 100° C.;

(b) routing the gaseous stream to the plurality of SMR tubes through feed piping or a feed distribution system, wherein internal surfaces of the feed piping or feed distribution system contacted by the gaseous stream include a nitridation-resistant material and/or a nitridation protective layer;

(c) introducing the gaseous stream into the SMR tubes of the furnace under conditions effective for catalytically cracking the ammonia, thereby forming a crude stream comprising hydrogen, nitrogen, and unreacted ammonia; and (d) introducing the crude stream into the PSA unit to produce a hydrogen product stream and a PSA offgas.

2. The method as claimed in claim 1, wherein the existing SMR is revamped to further comprise an ammonia storage vessel and an ammonia feed pump.

3. The method as claimed in claim 2, wherein step (a) further comprises withdrawing ammonia from the ammonia storage vessel; pumping the ammonia in the ammonia feed pump to a pressure of 25-60 bar(g); and then vaporizing the ammonia to provide the gaseous stream.

4. The method as claimed in claim 3, wherein the existing SMR is revamped to further comprise an ammonia vaporizer, wherein the ammonia is vaporized in the ammonia vaporizer to form the gaseous stream.

5. The method as claimed in claim 3, wherein the existing SMR is revamped to further comprise new equipment selected from the group consisting of an ammonia vaporizer, an ammonia interchanger, an ammonia preheater, an ammonia pre-reactor, and combinations thereof, wherein the new equipment is disposed upstream of the SMR tubes and downstream the ammonia feed pump.

6. The method as claimed in claim 3, wherein the existing SMR comprises an existing feed superheating section that is located upstream of the SMR tubes, wherein the ammonia is vaporized in the existing feed superheating section, wherein the existing feed superheating section comprises inner surfaces contacted by the gaseous ammonia that includes a nitridation-resistant material and/or a nitridation protective layer.

7. The method as claimed in claim 3, wherein the ammonia is vaporized using heat provided by electricity, steam, the crude stream, and/or a flue gas stream.

8. The method as claimed in claim 3, wherein the ammonia is vaporized and preheated to below 450° C.

9. The method as claimed in claim 1, wherein the crude stream contains less than 5.0 mol % unreacted ammonia.

10. The method as claimed in claim 1, wherein the conditions effective for catalytically cracking the ammonia include a pressure between 15-80 bar(g) and a temperature between 600-850° C.

11. The method as claimed in claim 1, wherein gaseous stream in step (a) is provided from a pressurized gaseous ammonia feed received from outside of the existing SMR.

12. The method as claimed in claim 1, wherein step (b) further comprises tying the feed distribution system into the SMR tubes at a tie-in point located upstream of the SMR tubes such that the gaseous ammonia bypasses existing hydrocarbon-specific equipment constructed of nitridation-susceptible materials.

13. The method as claimed in claim 12, wherein the existing hydrocarbon-specific equipment is selected from the group consisting of a desulfurization unit, a pre-reformer, and combinations thereof.

14. The method as claimed in claim 1, wherein the nitridation protective layer is formed using a process selected from the group consisting of (1) applying a protective liner material that is mechanically coupled to the inner surface, (2) applying an aluminization layer to the inner surface, and (3) applying a diffusion barrier layer in conjunction with the aluminization layer, wherein the diffusion barrier layer is disposed between the inner surface and the aluminization layer.

* * * * *